Jan. 18, 1966   N. SHORR   3,230,065
TRANSMISSION BAFFLE IN GLASS DRAWING ZONE
Filed Jan. 30, 1962   2 Sheets-Sheet 1

Figure 1:
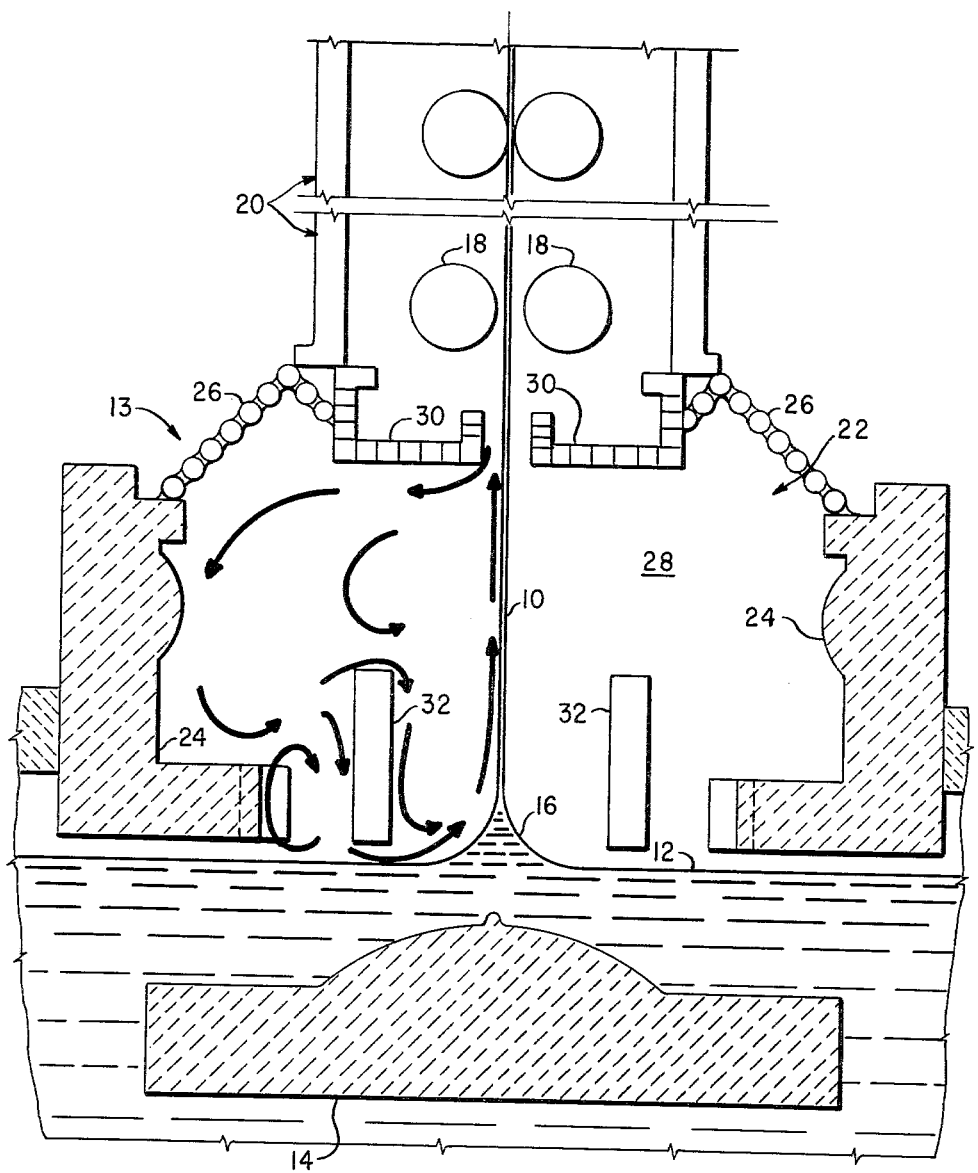

(PRIOR ART) *Fig. 1*

INVENTOR.
NORMAN SHORR
BY
Oscar H Spencer
ATTORNEY

United States Patent Office 3,230,065
Patented Jan. 18, 1966

3,230,065
TRANSMISSION BAFFLE IN GLASS
DRAWING ZONE
Norman Shorr, Mount Lebanon, Pa., assignor to Pittsburgh Plate Glass Company, Pittsburgh, Pa., a corporation of Pennsylvania
Filed Jan. 30, 1962, Ser. No. 169,756
1 Claim. (Cl. 65—204)

This invention relates to the manufacture of sheet glass by continuous drawing from a bath of molten glass and provides improved methods and apparatus for producing drawn sheet glass of improved appearance wherein the usual characteristic wave pattern, i.e., transverse thickness variations which appear as bands or ribs, extending generally in the direction of the draw, is eliminated or materially reduced while maintaining desired production speeds.

These characteristic wave pattern occur, primarily because of non-uniform cooling of the sheet across its width. To provide uniform cooling of the sheet, it is desirable to allow the heat loss to take place substantially entirely by radiation rather than by a transfer to convection currents or a combination of radiation and a transfer to convection currents.

In conventional process of drawing sheet glass, a natural stack is induced by the geometry of the sheet, bath and drawing chamber wherein there is a transfer of heat from the bath and sheet at relatively elevated temperature to the cooler ambient air within the chamber producing a convection flow of air in the direction of the draw and out of the chamber. The movement of heated air in the direction of the draw results in zones of reduced pressure at the base or meniscus of the sheet, so that colder air is drawn to the reduced pressure zones. Air enters the drawing chamber at the juncture of the chamber and the drawing machine and leaks into the chamber from cracks, crevices, or the like in the chamber walls. Colder air flowing to the zones of low pressure is chilled by moving generally across coolers, which are disposed within the chamber slightly above the surface of the bath and on opposite sides of the sheet to accelerate the setting of the glass. As readily understood, the temperature of entering air will be non-uniform because of difference in temperature of the sources of this air and this condition will persist due to differences in paths taken by this air in the drawing chamber, and, also, due to conditions within the kiln. These temperature differences cause non-uniform air velocities within the drawing chamber. The colder air of non-uniform velocities flows to the reduced pressure zones and disturbs the relatively thin surface adhering film moving with the glass causing non-uniform heat transfer across the sheet, thereby affecting the formation of the glass in the area where the glass undergoes the transition from fluid to solid state. Being in the plastic state and under stress, the glass is unequally attenuated to form a characteristic wave pattern.

Another characteristic wave pattern extends diagonally and usually exists on the outer margins of the sheet. This diagonal wave pattern may be so severe, in some instances, as to extend entirely across the sheet. The diagonal wave pattern, when superimposed on a longitudinal wave pattern provides a pattern referred to in the sheet glass industry as "batter" or "dapple," and is the result of colder air flowing from the vicinity of the ends of the coolers and the ends of the drawing chamber to the zones of low pressure at the base of the sheet. These currents of air are commonly referred to an "end-around currents."

Many arrangements have been proposed to improve the appearance of drawn sheet glass. One such arrangement is taught by Brichard in United States Patent No. 2,693,-052, wherein burners or suction means are disposed just above the surface of the bath to eliminate flow of relatively cold air to the base of the glass sheet in the direction of the draw. Thus, either no air flow takes place along the sheet or else such air flow as takes places moves along the sheet in a direction opposite to that of the draw.

Other arrangements to improve the appearance of drawn sheet glass have been proposed in the application for United States Letters Patent of Robert A. James and Cecil R. Ward, Serial No. 771,393, filed November 3, 1958, entitled "Manufacture of Glass." In this application, instead of eliminating the flow of air to the base of the sheet, as disclosed by the aforesaid Britchard, the flow of air to and from the base of the sheet is controlled or regulated, so as to be diminished but not eliminated, and thus the flow of air along the sheet in the direction of the draw is reduced but not eliminated. The flow of air in the direction of the draw forms an undisrupted unidirectional protective layer or envelope surrounding the sheet and moving at a velocity sufficiently low so that it does not disturb the relatively thin insulating surface adhering film of air surrounding the sheet, with a material reduction in attenuation variations, thus providing an improvement in the appearance of the sheet.

The provision of a protective envelope of air moving at a sufficiently low velocity in the direction of the draw results in minimizing cooling of the glass sheet by heat transfer through convection currents and thereby allows more uniform cooling of the sheet by radiation to the usual coolers spaced from the sheet and located slightly above the surface of the bath. The end-around currents are also reduced and/or rendered ineffective, so that the usual diagonal wave pattern is eliminated.

The various arrangements disclosed and claimed in the aforesaid James and Ward application for improving the appearance of drawn sheet glass include the use of means that serve as barriers, diverters, or insolators, or various combinations of these means so located and positioned within a drawing chamber or supported adjacent to components defining the chamber as to reduce the flow, i.e., quantity and velocity, of air to and from the base of a glass sheet as it is being drawn and to control the flow along the sheet to minimize non-uniformities in heat transfer from the sheet along its path of movement of the kiln.

The various arrangements disclosed and claimed in the aforesaid James and Ward application successfully accomplish their desired purpose, i.e., producing drawn sheet glass of improved appearance. However, the use of such arrangements results in a drawing speed loss as compared with glass produced using a usual kiln arrangement, thus resulting in a higher production cost per unit quantity of glass so produced.

An arrangement to recapture a portion of the speed loss has been proposed in the application for the United States Letters Patent of Cecil R. Ward, Serial No. 850,122, filed November 2, 1959, entitled "Manufacture of Glass." In this application, the structure of one of the pattern improvement elements of the aforesaid James and Ward application is modified, that is an elaborate "water-cooled" baffle is substituted for the previously disclosed "hot" baffle mounted between the vertical coolers and the glass sheet.

The water cooled baffles, in addition to reducing the velocity of the air flowing in the direction of the draw and reducing the quantity of air flowing into the zones at the base of the sheet, increases the speed of draw of the glass sheet. This is so because the water cooled baffles reduce the heat re-radiation to the base of the sheet so that the temperature of the bath and the sheet are not heated to abnormal temperatures, thus maintaining the desired degree of viscosity of the sheet. It is proposed, according to the present invention, to employ baffles of quartz, fused silica or the like in lieu of the materials described for the baffles disclosed in the aforementioned copending applications of James and Ward, and Ward.

In addition to recovering the speed loss attendant in the James and Ward application, the present invention further reduces distortion in the glass and does so with a structure much simpler and more inexpensive to construct, operate and maintain than the water cooled baffle of the Ward application.

Figure 2:
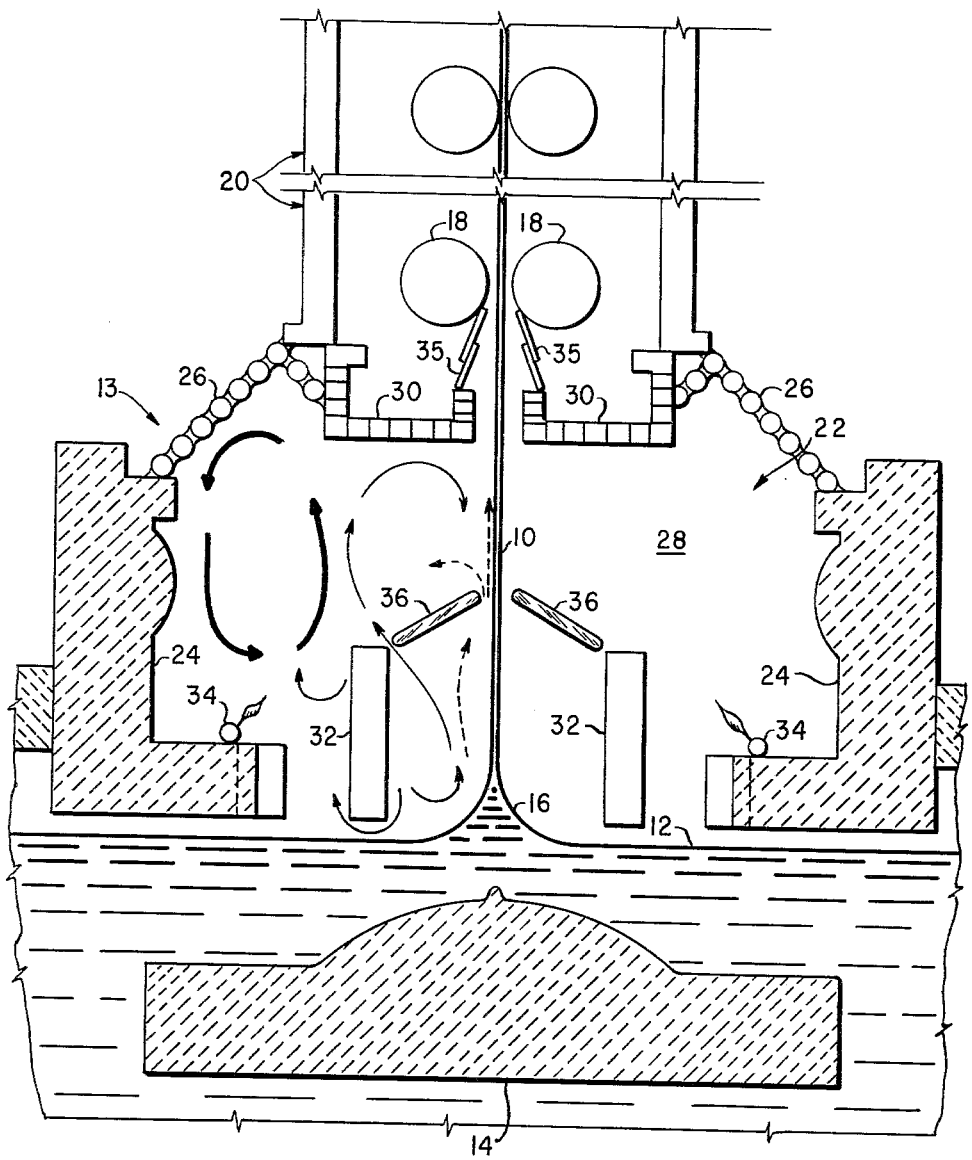

The objects and features of this invention will become apparent from the following description and the appended drawings, wherein:

FIGURE 1 shows diagrammatically a drawing kiln of conventional, prior art construction and the flow of principal air currents therein; and FIGURE 2 shows diagrammatically the preferred embodiment of a drawing kiln according to this invention and the flow of principal air currents therein.

Turning to the drawings wherein like parts are identified with like reference to characters, there is shown in each figure a sheet of glass 10 being drawn from a bath 12 of molten glass in a drawing kiln generally indicated at 13 (only parts of which are shown but which is of conventional construction). A draw bar 14 extending transversely of the kiln 13 is submerged in bath 12. The glass sheet 10 in its viscous condition forms a base or meniscus 16 with the surface of the bath 12, and the sheet 10 is drawn from the bath 12 through the drawing chamber 22 of kiln 13 by means of drawing rolls 18 of a conventional drawing machine generally indicated at 20. The drawing chamber 22, as depicted in the drawings, is defined by bath 12 and conventional L-blocks 24, ventilator water coolers 26, end walls 28 and catch pans 30. The ventilator coolers are each positioned between an L-block 24 and the base framework of the drawing machine 20 and extends substantially to the end walls 28 of the kiln 13. The base of the drawing machine 20 is substantially closed by means of the generally U-shaped catch pans 30, which are formed as coolers and are positioned so as to catch broken glass which may drop into the machine and thus prevent entry of fragments into the bath 12. These catch pans 30 also extend substantially to the end walls 28 of the kiln 13 and are constructed for the passage of cooling fluid, such as water. One leg of each catch pan 30 is disposed substantially parallel to and spaced from the sheet 10. Conventional water coolers 32 are provided for cooling sheet 10 by absorbing radiation from the sheet 10. The coolers 32 are spaced above the surface of the bath 12 and are positioned on opposite sides of the sheet 10 to extend substantially the width of the sheet.

So much of the apparatus as has been just described is common to the prior art and the instant invention and constitutes a normal or usual sheet glass drawing apparatus set-up.

Reference is now made to FIGURE 2 illustrating the preferred embodiment of this invention wherein, in addition to the conventional apparatus elements in their usual structure arrangement, there are burners 34 and adjustable dampers 35 on each side of sheet 10 and disposed between the catch pans 30 and the first pair of rolls 18 of the drawing machine 20. Dampers 35 extend substantially the width of drawing machine 20. The burners 34 extend transversely of the chamber 22 for at least the width of sheet 10. In addition to the burners 34 and the dampers 35, which are the same as described in the James and Ward application, there are also baffle elements 36 constructed preferably of quartz, fused silica, or a similar material transparent to infrared radiation. The baffles 36 extend transversely of the chamber 22 for at least the width of the sheet 10 and, as will be explained, all of the above-described devices affect the normal air currents within the chamber 22.

The burners 34 are pipes, each having closely spaced holes through which combustible fluid can escape, preferably normal to the longitudinal axis of pipe 34. Upon combustion the gaseous products form a substantially continuous sheet of heated gas extending across chamber 22. The burners 34 are illustrated as having their flames directed upwardly at an inclined angle towards sheet 10. The burners 34 are so constructed as to be rotatable to vary the inclined angle of the flames. The dampers 35 are constructed so as to be adjustable to vary their angular disposition and their upward disposition and by adjustment can be spaced from or wipe against rolls 18. The baffles 36 are constructed for rotation about the edge adjacent to coolers 32 and are illustrated as being inclined upwardly from the top of the coolers 32 towards sheet 10.

In FIGS. 1 and 2 of the drawings, the directions of the principal air currents within the drawing chamber 22 are shown by arrows for the left-hand portion of chamber 22. It is not necessary to show the principal air currents to the right of sheet 10 because they are mirror images of those shown. Relatively high, intermediate, and relatively low velocity air currents are shown in heavy solid, light solid, and broken lines, respectively. In FIG. 1 the principal air currents for the normal drawing kiln arrangement are illustrated.

The temperature of glass sheet 10 in its travel through chamber 22 is substantially above the general air temperature within chamber 22, so that sheet 10 induces air to flow in the direction of its draw and along its faces. This air flow creates low pressure zones in the vicinity of each side of the base 16 of sheet 10. The currents of air along the faces of the sheet are those which form the natural stack effect. This layer of air along the sheet moves at a substantially greater velocity than the sheet. To supply this stack flow of air there must be a supply of air flowing to the low pressure zones. A primary source of this air is the drawing machine. That air enters chamber 22 between sheet 10 and catch pans 30 at a temperature below that of sheet 10 and flows past the catch pans 30, which are constructed as coolers, the ventilator coolers 32 and the L-blocks 24 between the end walls 28, all at relatively low temperatures, so that a zone on each side of sheet 10 and generally bounded by catch pan cooler 30, ventilator cooler 32, L-block 24 and walls 28 become a secondary source of colder air. The temperature in this secondary zone will vary transversely thereof, being lower adjacent the end wall 28, so that air in different portions in this zone will also vary in temperature. Air from this zone flows to the low pressure zone at the base 16 on each side of sheet 10. The colder air from the secondary source flows downwardly and across the faces of coolers 32, being further chilled, and into the low pressure zone at the base 16 of sheet 10, thereby providing a relatively large quantity of colder air, and, more importantly, colder air moving at relatively high velocities of different magnitudes to the low pressure zones. This colder air or different temperatures and velocities transversely of chamber 22 disturbs non-uniformly the air traveling with the sheet, resulting in the formation of the usual characteristic longitudinal wave pattern extending in the direction of the draw. End-around currents of colder air also flow to the low pressure zones at the base 16 of sheet 10 and disturb the air flowing with the sheet in the direction of the draw, thus resulting in the diagonal wave pattern.

The kiln arrangement depicted in FIG. 2 includes the use of means which act as barriers, diverters, and isolators and these are so located and positioned in the drawing kiln to reduce the flow, i.e., quantity and velocity, of air to the base of a glass sheet as it is being drawn, thereby eliminating or materially reducing the intensity of the usual characteristic wave pattern. For purposes of later description, a barrier is a physical obstruction placed in a flow stream thereby reducing its velocity; a diverter is a device which changes the direction of flow of a fluid; and, an isolator is that which reduces or eliminates the quantity of fluid flowing into and/or out of a zone. The various pattern improvement devices employed in the kiln arrangements depicted in FIG. 2 primarily perform one of the described functions.

Looking at FIG. 2, the kiln arrangements include burners 34, dampers 35 and the baffle assemblies 36 of this invention. The entry of air from a primary source, i.e., the drawing machine 20, is effectively prevented or materially reduced by dampers 35, so that the quantity of relatively colder air moving to chamber 22 is materially reduced, and it follows that the quantity of air moving out of chamber 22 is also materially reduced. Thus, the velocity of air moving out of chamber 22 is lowered.

The burners 34 shown as having their flames angularly directed away from the L-blocks 24 alter or divert the path of movement of air in the zone of the secondary source of air, giving a cyclic path to this air. The burners 34 also create zones of low pressure adjacent their locations, so that air from the vicinity of the coolers 32 is diverted into the cyclic path of the air in the zone of the secondary source. Thus, the direction of flow across the coolers 32 is altered. This altering and diversion of air by burners 34 reduces the quantity of air flowing to the base of the sheet 10. As a result the velocity of the layer of air moving in the direction of the draw from the base 16 is lessened.

The baffle assemblies 36 reduce the quantity of air flowing out of the low pressure zones at the base of the sheet, i.e., in the direction of the draw, and thus serve to further reduce the velocity of this air flowing in the direction of the draw. Because of this reduction in the quantity of air flowing from the zones at the base of the sheet, the quantity of air flowing into these zones is also further reduced.

With reduced flow of air in the direction of the draw, the effects of its non-uniformity in velocities and temperatures are diminished, leading to the elimination of the disturbance of the relatively thin surface film of air adjacent the sheet and the elimination or material reduction in the intensity of the wave pattern of the sheet.

The baffle assemblies 36, when spaced from the cooler 32 also provide an auxiliary stack effect whereby air between coolers 32 and the established protective envelope of air moving in the direction of the draw is diverted and is carried into cyclic paths in the zone of the secondary source. The end-around currents are pulled into this stack, so as to be rendered ineffective to cause a diagonal wave pattern on the sheet. The auxiliary stack effect also inhibits the occurrence of undesirable cyclic currents of air in the low pressure zone adjacent the base 18 of the sheet 10.

Thus, the catch pan dampers 38 primarily serve as barriers; the burners 34 primarily serve as diverters; and the baffle assemblies 36 primarily serve as isolators.

As hereinabove mentioned, the baffle assemblies 36 are constructed of a refractory material, such as fused silica, quartz, or a similar material transparent to at least 25 percent of the infrared energy reaching its surface. The baffle assemblies 36 of this invention function to increase the speed of the draw of the glass sheet over that obtained by using solid metal baffles as taught in the aforesaid James and Ward application. Solid metal baffles, as taught in that application re-radiate heat to the bath and the sheet, the direction of re-radiation being substantially normal to the plane of the baffle. The viscosity of the sheet adjacent its zone of formation is lowered and the rate of change from fluid to solid state occurs more slowly than usual, so that the drawing speed must be reduced from that normally encountered to maintain the draw of the sheet.

Provision of a baffle which is transparent to radiant energy in accordance with this invention enhances production speed by transmitting radiant energy from the glass bath and the sheet to the catch pans 30, which are constructed as coolers, and ventilator coolers 28. These quartz or fused silica baffles eliminate the re-radiation of heat energy to the bath of molten glass and the sheet adjacent the base, so that the temperature of the bath and the sheet in its area of formation are not heated to abnormal temperatures, thus the major portion of the loss in drawing speed encountered by use of the pattern improvement devices may be recaptured. The recapturing of a major portion of the speed loss attendant to the use of pattern improvement equipment in the form of isolators however has no effect on the pattern improvement in the glass sheet produced by the device.

In addition it may readily be understood that a more viscous sheet makes the operation of a drawing apparatus more normal, characterized by normal drawing speeds and thus the operation is more stable, with less likelihood of losing the sheet. In addition, the reduction or elimination of re-radiation to the glass bath and sheet will minimize the potential defects in the sheet such as seeds or blisters.

With the present invention, it is apparent that the pattern improvement is at least as good as the pattern improvement attained with the James and Ward pattern improvement devices. This is the case because geometrically the apparatus is identical. In fact, however, the pattern is additionally improved by permitting radiation from the glass sheet to the catch pan cooler and the ventilator coolers, thereby providing an additional stack effect. As above mentioned, the speed loss attendant in the James and Ward application is recaptured, and without the dangers of introducing a cooled edge closely adjacent the shet resulting in the possibility of a severe temperature change which would disrupt the film of air traveling with the sheet in the direction of the draw thereby inducing undulations in the sheet at this area.

Experience has shown that each and every sheet glass drawing kiln differs somewhat in operation, probably due to minor differences in dimensions, locations of cracks, crevices or the like, location relative to the glass melting tank, etc. Therefore, the exact placement and setting of burners, dampers, and baffle assemblies to give a particular result requires merely individual adjustment and positioning for each drawing kiln. One manner in arriving at the current adjustment and positioning is by observing the air currents within the chamber. This may be accomplished by placing a smoke producing agent at various locations in the chamber. This procedure also allows the observer to compare, generally, the relative velocity of the air currents.

In the kiln arrangements, the burners 34 and dampers 35 are preferably of the construction described in the aforesaid James and Ward application and are positioned and adjusted in the manner disclosed therein.

Satisfactory operation has been accomplished with baffle assemblies 36, spaced 1 inch from the coolers 32, inclined 40 degrees to the horizontal towards the sheet 10 and spaced ½ inch from the sheet. It is also possible to satisfactorily operate the drawing kiln with the baffle members 36 abutting the coolers 32. However, spacing the baffles 1 inch to 2 inches from the coolers 32 is preferred. It is also possible to increase the spacing between the baffles 36 and the sheet 10 with a limit of ¾ of an inch spacing for good pattern improvement. Further spacing results in less pattern improvement because the baffle assembly does not function as efficiently as an isolator. Closer spacing of the baffle to the sheet 10 than ½ inch seriously affects the drawing operation and is not advisable.

It has been stated above that the appearance of a glass sheet is improved by use of the present invention as a modification of pattern improvement arrangements suggested in the James and Ward application, and the use of the present invention provides for a speed gain over that provided with the James and Ward arrangement when the James and Ward arrangements are employed.

By way of example, refractory material that will function in accordance with this invention includes sheets of fused silica, 90 percent silica glass, quartz, or other high softening point glasses. In each instance the material must be capable of withstanding elevated temperatures on the order of 1500° F. encountered within the drawing chamber and, also, be able to transmit at least 25 percent of the infrared radiant energy reaching its surface.

Fused silica has the composition $SiO_2$ in amorphous or non-crystalline condition and may be made by melting crushed silica quartz, or sand, without any other constituents. It is characterized by a high softening temperature and a low coefficient of expansion. Ninety-six percent silica glass has the approximate composition of 96.3% $SiO_2$, 2.9% $B_2O_3$, 0.4% $Al_2O_3$ and 0.4% other alkalies and may be made by leaching out soluble constituents of a boro-silicate glass with acids, and then fusing at high temperatures the porous skeleton of almost pure silica. A transparent, non-porous, high softening point glass results.

An example of a high softening point glass capable of being used as a baffle assembly as described, is disclosed in the copending application, Serial No. 104,240, filed April 20, 1961, now Pat. No. 3,022,183, of James E. Duncan et al. The glass therein disclosed and claimed has a strain point of 1150° F. to 1350° F., a coefficient of thermal expansion of 4.4 to $5.6 \times 10^{-6}$ per degrees C. from 3° to 300° C. and an annealing point of about 1230° F. to 1380° F., and a softening point of about 1500° F. to 1700 F. The glass therein described has a high degree of resistance to thermal shock because of the low coefficient of thermal expansion and in addition has optical and the required infrared clarity. For example, sheets of glass made in accordance with the aforesaid U.S. application of Duncan et al., and ¼ inch to ½ inch thick will transmit approximately 90 percent of the infrared radiant energy reaching their surfaces.

Fused silica, depending upon its thickness and transparency, varies in its ability to transmit infrared radiant energy. It has been found, however, that a ⅜ inch sheet of standard grade commercially obtained fused silica, such as that produced by Engelhard Industries, Inc., under the trade name "Amersil," will transmit from 30 percent to 50 percent of the radiant energy reaching its surface. As the thickness of the material is increased it becomes desirable to use materials which transmit a greater percentage of infrared radiation.

As a practical matter ¼ inch to ½ inch thick sheets of material are preferred for following the teaching of this invention. Sheets less than ¼ inch in thickness generally lack required strength, and sheets more than ½ inch in thickness are generally too heavy for the purpose described. Thickness, color and surface finish affect the transmission of infrared radiant energy: for example, the thicker the sheet, the lower the transmission; clearer material has a higher transmission than colored material; and smooth surface material has a higher transmission than rough-surfaced material.

Applicant has described his invention in great detail; however, the invention must be limited only to the language of the claim which follows.

I claim:

In an apparatus for drawing improved appearance sheet glass from a bath of molten glass which includes a drawing chamber overlying said bath and cooling members located within said drawing chamber and adjacent each face of the sheet of glass drawn therethrough, each cooling member having broad surfaces spaced opposite to and coextensive with the adjacent surface of said drawn glass sheet to provide an upwardly extending zone between each cooler and the adjacent surface of the drawn glass sheet extending upwardly in said drawing chamber and in which zones relatively high velocity currents of cooled air flow over the surface of the drawn glass sheet in the direction of the draw and radiant energy from said bath of molten glass and said drawn glass sheet is transmitted upwardly in said drawing chamber, the improvement which comprises, a baffle coextensive the width of the drawn glass sheet located on each side thereof and positioned transversely in said drawing chamber with respect to and across the upwardly extending zone between the surface of the glass sheet and the adjacent cooler, said baffles being transparent to at least 25 percent of the radiant energy reaching the surfaces thereof and each baffle having an edge positioned adjacent the surface of the drawn glass sheet and an edge positioned adjacent the surface of the opposed adjacent cooler, whereby the velocity of the currents of air flowing over the surface of the drawn glass sheet in the direction of the draw in said zones between said coolers and the drawn glass sheet is reduced and radiant energy from said molten bath and the drawn glass sheet is transmitted through said zones and said baffles away from said coolers into the regions of the drawing chamber thereabove.

References Cited by the Examiner

UNITED STATES PATENTS

| | | | |
|---|---|---|---|
| 1,593,566 | 7/1926 | Byrnes | 65—344 |
| 1,598,730 | 9/1926 | Koupal | 65—83 |
| 1,893,061 | 1/1933 | Peiler | 65—346 |
| 2,352,539 | 6/1944 | Halbach et al. | 65—84 |
| 3,097,942 | 7/1963 | James et al. | 65—204 |

FOREIGN PATENTS 768,741   2/1957   Great Britain.

DONALL H. SYLVESTER, *Primary Examiner.*